(12) United States Patent
Jenny et al.

(10) Patent No.: US 9,975,513 B2
(45) Date of Patent: May 22, 2018

(54) PROTECTION ARRANGEMENT FOR A PASSENGER OF A VEHICLE, VEHICLE WITH THE PROTECTION ARRANGEMENT AND METHOD FOR MANUFACTURING THE PROTECTION ARRANGEMENT

(71) Applicant: GM GLOBAL TECHNOLOGY OPERATIONS LLC, Detroit, MI (US)

(72) Inventors: Thomas Jenny, Ruesselsheim (DE); Juergen Maier, Ruesselsheim (DE); Andreas Meinel, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/248,802

(22) Filed: Aug. 26, 2016

(65) Prior Publication Data
US 2017/0057446 A1    Mar. 2, 2017

(30) Foreign Application Priority Data
Aug. 26, 2015    (DE) ........................ 10 2015 010 978

(51) Int. Cl.
*B60R 21/201*    (2011.01)
*B60R 21/235*    (2006.01)
*B60R 21/217*    (2011.01)

(52) U.S. Cl.
CPC .......... *B60R 21/201* (2013.01); *B60R 21/217* (2013.01); *B60R 21/235* (2013.01); *B60R 2021/23533* (2013.01)

(58) Field of Classification Search
CPC ... B60R 21/201; B60R 21/217; B60R 21/235; B60R 2021/23533
See application file for complete search history.

(56) References Cited

U.S. PATENT DOCUMENTS

| | | | |
|---|---|---|---|
| 5,022,676 A | 6/1991 | Rogerson et al. | |
| 6,115,998 A * | 9/2000 | Reh ........................ | B60R 21/237 53/429 |
| 6,250,675 B1 * | 6/2001 | Dietsch ................. | B60R 21/237 280/743.1 |
| 6,726,615 B1 * | 4/2004 | Lang ..................... | B60R 21/237 280/728.1 |
| 7,549,271 B2 | 6/2009 | Miwa et al. | |
| 7,963,558 B2 | 6/2011 | Glaab et al. | |
| 7,997,609 B2 | 8/2011 | Basten et al. | |
| 8,002,308 B2 | 8/2011 | Hamels | |
| 2002/0135160 A1 | 9/2002 | Lorenz | |

(Continued)

FOREIGN PATENT DOCUMENTS

| | | |
|---|---|---|
| DE | 102008044912 A1 | 4/2009 |
| DE | 102011106749 A1 | 1/2013 |

(Continued)

*Primary Examiner* — Drew J Brown
(74) *Attorney, Agent, or Firm* — Lorenz & Kopf LLP

(57) ABSTRACT

A protection arrangement for an occupant of a vehicle includes an air bag package and a structural component. The structural component includes a reception with a profile geometry for the air bag package. The air bag package includes a receiving section which is received in the reception. The receiving section includes a permanent press contour corresponding and/or equals to the profile geometry of the reception.

16 Claims, 3 Drawing Sheets

(56) References Cited

U.S. PATENT DOCUMENTS

| | | | |
|---|---|---|---|
| 2007/0145724 A1* | 6/2007 | Miwa | B60R 21/20 |
| | | | 280/728.1 |
| 2007/0241541 A1 | 10/2007 | Miwa et al. | |
| 2009/0102164 A1 | 4/2009 | Eckert et al. | |
| 2011/0181031 A1* | 7/2011 | Wipasuramonton | B60R 21/235 |
| | | | 280/743.1 |
| 2012/0211971 A1* | 8/2012 | Okamura | B60R 21/201 |
| | | | 280/728.2 |
| 2015/0108741 A1 | 4/2015 | Ostman et al. | |
| 2015/0175115 A1* | 6/2015 | Sandt | B60R 21/201 |
| | | | 280/743.1 |
| 2015/0329998 A1* | 11/2015 | Ise | D03D 15/0077 |
| | | | 280/743.1 |
| 2015/0367801 A1* | 12/2015 | Fukuda | B60R 21/232 |
| | | | 280/728.2 |
| 2017/0210331 A1* | 7/2017 | Komatsu | B60R 21/237 |

FOREIGN PATENT DOCUMENTS

| | | |
|---|---|---|
| EP | 1031473 A2 | 8/2000 |
| JP | H04146840 A | 5/1992 |

* cited by examiner

PROTECTION ARRANGEMENT FOR A PASSENGER OF A VEHICLE, VEHICLE WITH THE PROTECTION ARRANGEMENT AND METHOD FOR MANUFACTURING THE PROTECTION ARRANGEMENT

CROSS-REFERENCE TO RELATED APPLICATION

This application claims priority to German Patent Application No. DE10201501.0978.2, filed Aug. 26, 2016, which is incorporated herein by reference in its entirety.

TECHNICAL FIELD

The present disclosure relates to a protection arrangement for an occupant of a vehicle and a vehicle with a protection arrangement. The present disclosure further relates to a method for manufacturing a protection arrangement for an occupant of a vehicle.

BACKGROUND

Airbag arrangements are integrated in most vehicles for protection of an occupant in case of a collision. It is known to vacuum pack the airbag arrangements in order to integrate the same in a vehicle in an installation space saving manner.

For example, DE 10 2008 044 912 B2 describes a gas bag package with a shaping envelope which is evacuated and which encompasses the gas bag package. The gas bag package is brought to form fit with a second component in a subsection of the gas bag package by inserting the gas bag package in the second component.

SUMMARY

The embodiments of the present disclosure provide an installation space saving protection arrangement for an occupant of a vehicle. In particular, a protection arrangement for an occupant of a vehicle, for example a passenger car, a truck or a lorry, is proposed. Preferably, the occupant is seated on a vehicle seat of the vehicle, which seat can be a front seat, in particular a driver's seat. Alternatively, the vehicle seat can be a seat of a rear bench of the vehicle. Preferably, the vehicle seat includes a back rest at which the occupant can lean against with his or her back. For example, the vehicle seat is arranged adjacent to a vehicle door of the vehicle.

The protection arrangement includes an air bag package. Preferably, the air bag package is rolled or folded to a package which is an air bag and/or a so called airbag. In this embodiment, the air bag has an inactive state. Preferably, the protection arrangement includes a gas generator which is adapted to release gas in an explosive manner during and/or after a collision. Optionally, the gas generator is fluidically connected with the air bag. In particular, the gas generator is activated by the collision of the vehicle so that the air bag is activated in an explosive manner and is inflated by the gas. The protection arrangement includes a structural component. The structural component includes a reception for the air bag package. The reception has a profile geometry, in particular along a cross section the section line of which extends across a longitudinal extension of the structural component. For example, the profile geometry can have corners and/or radial progressions.

The air bag package includes a receiving section which is received in the reception of the structural component and/or can be received therein. Preferably, the receiving section includes subsection of the air bag package. It is also possible within the scope of the present disclosure that the receiving section includes the entire air bag package. Optionally, the receiving section is formed as a bulge of the air bag package which is in particular directed to an inflate direction of the air bag. In particular, the air bag package is arranged in front of the structural component relative to the inflate direction of the air bag and/or the airbag. Especially, the inflate direction is directed such that the occupant or a pedestrian can be absorbed after a collision by the air bag and thereby be protected from injuries. In the direction opposite to the inflate direction, the receiving section of the air bag package is preferably arranged in and/or at the structural component.

The receiving section of the air bag package includes a permanent, in particular permanently lasting press contour. Preferably, the press contour of the receiving section remains permanent lasting even in case of a mounting or insertion of the air bag package into the reception. The press contour of the receiving section corresponds to the profile geometry of the reception.

It is advantageous that a receiving space of the reception can be used better as a result of the press contour of the receiving section corresponding to the profile geometry, and as the air bag package has a reduced package volume due to the permanent press contour. In particular, the air bag package is arranged or can be arranged in the receiving section custom-fit at the structural component, especially in the reception. In particular, the press contour of the receiving section follows the profile geometry of the reception, so that a uniform gapping of the air bag package in the reception can be achieved. Thus, a leaner outer geometry of an interior fitting, for example a vehicle seat, of the vehicle is enabled. This is especially advantageous when integrating air bag packages being of larger volume. Thus, an interior design of the vehicle can be organized more flexible and/or optically improved.

In a preferred embodiment of the present disclosure the permanent press contour of the receiving section is made by pressing, preferably by thermal pressing of the air bag package. In particular, the air bag package is inserted preferably in a thermal pressing tool and pressed therein, thereby forming the permanent press contour of the receiving section, in particular after a determined process time and process sequence.

A preferred constructive realization of the present disclosure provides the receiving section of the air bag package being received positively locked or being enabled to be received positively locked in the reception of the structural component. In particular, the air bag package is insertable with the receiving section in the reception so that a positive-locking is provided between the receiving section and the reception. Especially preferred, in the mounted state of the air bag package no or only a minor uniform gap course exists between the press contour of the receiving section and the profile geometry of the reception. Optionally, the profile geometry of the reception forms a positive form and the press contour of the receiving section forms a corresponding negative form. In particular, the receiving section custom-fits into the reception due to the press contour corresponding the profile geometry.

In a preferred constructive embodiment of the present disclosure, the structural component is designed bent-proof. For example, the structural component is made of a metal alloy or a plastic material. Especially preferred, the structural component is designed as an equipment element. The equipment element can be a seat frame of the vehicle seat, in particular of the back rest. Especially, the seat frame is integrated laterally in the back rest of the vehicle seat, for example directed towards a vehicle door of the vehicle. Alternatively or optionally in addition, the equipment element can be designed as a lining or trim component of the interior fitting of the vehicle. In this case, it can be arranged for example at a vehicle wall, at the vehicle roof, in particular at a cross strut of the roof at a vehicle pillar and/or in the area of the cockpit or the instrument panel of the vehicle, in the previously mentioned use cases, the air bag package is preferably formed as a front airbag package and/or a side airbag package for protecting the occupant. Preferably, the air bag package is formed for protecting the occupant in case of a lateral or frontal collision of the vehicle. Here, the air bag inflates laterally besides the occupant and/or in front of the occupant, thereby receiving the occupant's torso by the inflated air bag and protecting it from injuries.

Alternatively or optionally in addition, the equipment component may be arranged in the region of the vehicle chassis, for example in the front region of the vehicle, in particular underneath the hood or bonnet. In this case, the air bag package is designed as a pedestrian air bag package for protection of a pedestrian. In particular, the pedestrian air bag package protects the pedestrian in case of a collision with a vehicle front, for example with a hood of the vehicle.

Within the scope of the present disclosure it is possible that the air bag package is formed shaping envelope free. In particular, the air bag package does not include a shaping envelope. Alternatively, within the scope of the present disclosure it is possible that the air bag package includes the shaping envelope, for example in the form of a foil completely enclosing the air bag package, as a textile fabric, for example felt, or as a housing, for example a plastic housing. Preferably the shaping envelope cures during being pressed in the pressing tool, so that maintaining of the permanent press contour of the air bag package is supported. Preferably, the air bag package can be pressed with the thermal pressing tool in both cases, with or without the shaping envelope, so that the permanent press contour is formed at the receiving section.

It is preferred that the gas generator is arranged in or at the pressed air bag package. For example, the gas generator is integrated within the air bag package. In particular, and here, an igniter of the gas generator protrudes from the air bag package, so that an electric contact for igniting the gas generator can be connected to the igniter.

Within the scope of the present disclosure it is alternatively possible that the gas generator is arranged distant and/or spaced apart from the air bag package. In this case, the gas generator is preferably fluidically connected with the air bag package, for example via a line or a hose. During and/or after the collision of the vehicle, the gas generator is ignited so that the gas provided therein is released in an explosive manner and streams into the gas air bag package so that the air bag is inflated and can protect the occupant from injuries resulting from an impact with the torso on the vehicle door.

A further subject matter of the present disclosure relates to a vehicle with a protection arrangement as further described herein. Also within the scope of the present disclosure, a method for manufacturing the protection arrangement for the occupant of the vehicle is furthermore proposed. The air bag package is thermally pressed within the scope of the method, so that the permanent press contour is formed at the receiving section of the air bag package, wherein the permanent press contour corresponds to and/or equals to the profile geometry of the reception. Preferably, the air bag package is thermally pressed separately from the structural component. Within the scope of the method it is alternatively possible that the air bag package is thermally pressed together with the structural component, in particular in the thermal pressing tool. Preferably, the receiving section of the air bag package is inserted into the reception of the structural component positively locked.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is intended to limit the invention or the application and uses of the invention. Furthermore, there is no intention to be bound by any theory presented in the preceding background of the invention or the following detailed description.

Figure 1:
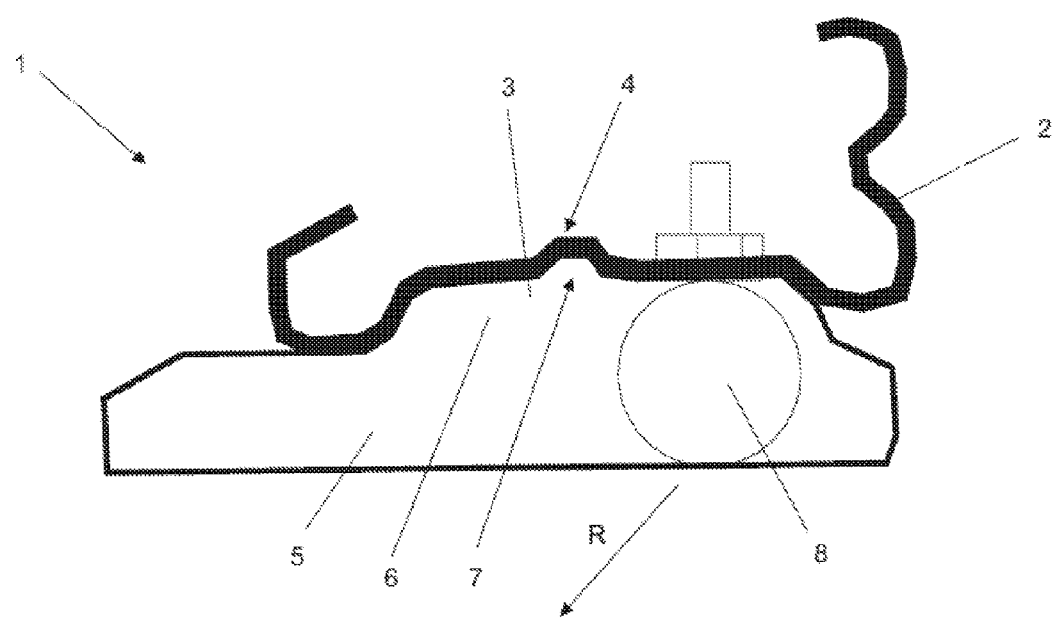
FIG. 1 shows a sectional view of a protection arrangement with a structural component and with an air bag package, wherein the section line extends across a longitudinal extension of the structural component.

FIG. 1 shows a sectional view of a protection arrangement 1 for an occupant which seats on a vehicle seat of a vehicle. The vehicle is designed as an occupant car or lorry. The vehicle seat is integrated in the vehicle and is designed as a front seat, for example as a driver's seat or an occupant seat. Alternatively, the vehicle seat can be designed as a seat in a rear bench.

The protection arrangement 1 includes a bent-proof structural component 2. The structural component 2 is shown in detail in FIG. 2. The structural component 2 is formed as an equipment element of the vehicle and in particular according to FIG. 1 as a seat frame of the vehicle seat, in particular as a seat frame integrated in a back rest of the vehicle seat. The equipment element is made of a metal alloy. In an alternative exemplary embodiment, the structural component 2 may be made of plastic material. In an alternative exemplary embodiment, the equipment element can be designed as a trim component of an interior fitting of the vehicle, for example of a vehicle wall, a vehicle roof, or an instrument panel. In another exemplary embodiment it is possible that the equipment element is arranged at a front of the vehicle, for example at a vehicle chassis or at or underneath a hood or bonnet.

According to FIG. 1, the protection arrangement 1 includes a gas generator 8 which releases gas in an explosive manner to an air bag package 5 during and/or after a collision of the vehicle, for example as a result of a side collision. The gas generator 8 is arranged and/or integrated within the air hag package 5. In an alternative exemplary embodiment, the gas generator 8 is arranged spaced apart and/or distant from the air bag package 5. In this case, the gas generator 8 is for example fluidically connected with the air bag package 5 via suitable lines.

Figure 3:
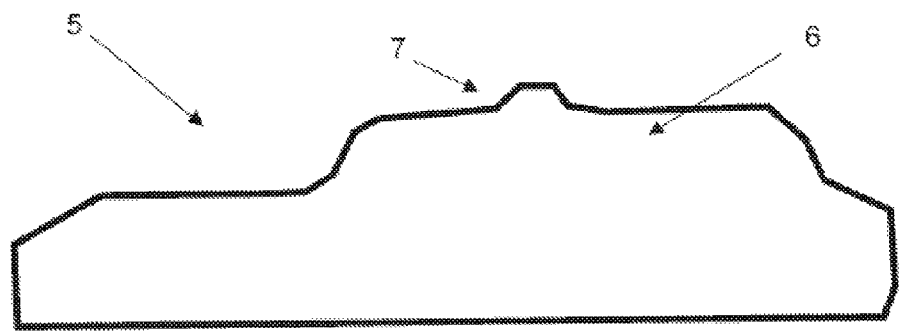
FIG. 3 shows the air bag package in the sectional view of FIG. 1.

According to FIG. 1, the protection arrangement 1 includes the air bag package 5. The air bag package 5 is shown in detail in FIG. 3. The air bag package 5 is designed as side airbag or front airbag of the vehicle and is rolled or folded to a package, for example for integration in the vehicle seat, in particular for integration in the back rest.

The air bag package 5 is designed free of a shaping envelope. In particular, the air bag package 5 does not include any shaping envelope. In an alternative exemplary embodiment, the air bag package 6 may include a shaping envelope. The shaping envelope encompasses the air bag package 5 and is made of a foil, for example, which foil is made of a textile material or of a plastic housing. In particular, the shaping envelope cures during pressing in the pressing tool. Thereby, a persistence of a permanent press contour 7 of the air bag package 5 can be supported.

While and/or after activation of the air bag package 5 as a result of the impact, the air bag inflates by the gas in an inflate direction R, in particular between the back rest and the vehicle door, so that the occupant with his or her torso is retained by the inflated air bag and an impact of the torso onto the vehicle door is prevented.

The air bag package 5 is arranged in front of the structural component 2 opposite to the inflate direction R. Thereby, the air bag package 5 is obscured and/or covered by the structural component 2 against the inflate direction and/or towards the vehicle door.

Figure 2:
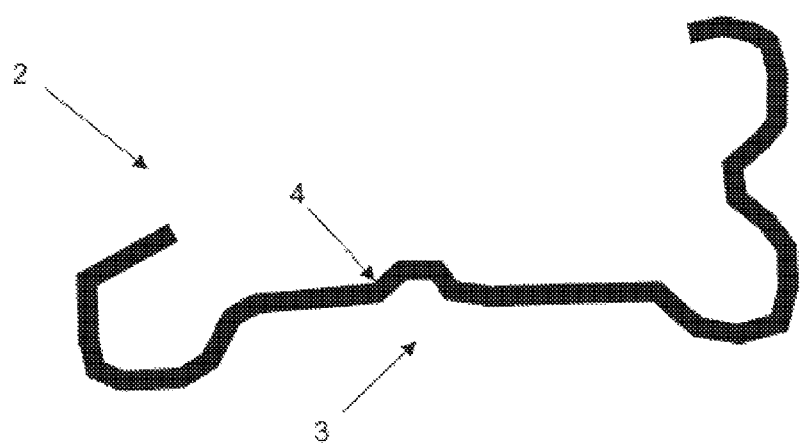
FIG. 2 shows the structural component in the sectional view of FIG. 1.

As shown in FIG. 2, the structural component 2 includes a reception 3. The reception 3 has a profile geometry 4 with corners and/or radii. According to FIG. 3, the air bag package 5 includes a receiving section 6. The receiving section 6 includes a persistent, in particular permanently lasting press contour 7. The receiving section 6 of the air bag package 5 is, according to FIG. 1, positively locked within the reception 3 of the structural component 2. This is possible as the press contour 7 of the receiving section 6 equals to and/or corresponds to the profile geometry 4 of the reception 3. Thereby, the press contour 7 follows the course of the profile geometry 4. In particular, the profile geometry 4 of the reception 3 forms a negative form to the press contour 7 of the receiving section.

The permanent press contour 7 of the receiving section 6 is formed as a result of the air bag package 5 being thermally pressed in a thermal pressing tool. It is possible that the air bag package 5 is pressed together with the structural component 4 in the thermal pressing tool, so that the press contour is pressed based on the profile geometry or together with the profile geometry. In an alternative exemplary embodiment, it is possible that the air bag package 5 is pressed in the thermal pressing tool separate from the structural component 2. After the thermal pressing of the air bag package 5, the air bag package is inserted positively locked and/or mounted in the reception 3 of the structural component 2.

Figure 4:
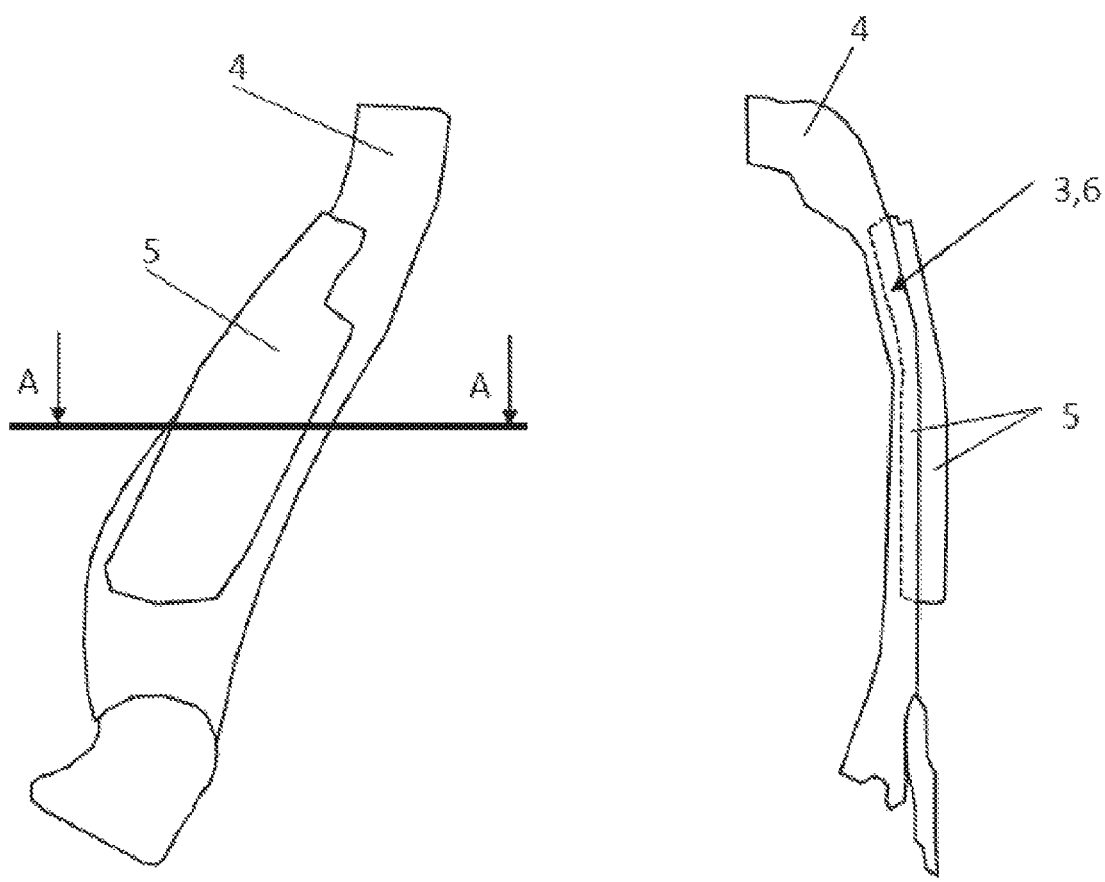
FIG. 4a shows the structural component and the air bag package arranged at the structural component in a top view.
FIG. 4b shows the structural component and the air bag package arranged at the structural component in a sectional view along the section line A-A.

FIG. 4a shows a top view of the air bag package 5 and the structural component 4. FIG. 4b shows a sectional view of the air bag package 5 and the structural component 4, wherein a section line A-A extends across a longitudinal extension of the structural component.

The structural component 4 is designed as a seat frame of the vehicle seat, in particular of the back rest. The air bag package 5 is designed as a side airbag package arranged at the seat frame. The air bag package 5 is positively locked with the receiving section 6 in the reception 3 of the structural component 4. A subsection of the air bag package 5 protrudes from the reception 3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A protection arrangement for a passenger of a vehicle defining a first side and a second side that extend along a longitudinal extension of the protection arrangement, the first side being opposite the second side, the protection arrangement having a cross section taken transverse to the first side and the second side, the protection arrangement comprising:
    a structural component having a reception portion with a profile geometry in the cross section; and
    an air bag package having a first peripheral side and a second peripheral side in the cross section, the air bag package having a bulging receiving section that is spaced from the first peripheral side and the second peripheral side in the cross section, the bulging receiving section received within the reception portion of the structural component, wherein the bulging receiving section has a negative press contour corresponding to the profile geometry of the reception portion.

2. The protection arrangement according to claim 1, wherein the receiving section is positively locked within the reception portion.

3. The protection arrangement according to claim 1, wherein the structural component is configured as a bent-proof component.

4. The protection arrangement according to claim 1, wherein the structural component is made of a material selected from a metal alloy or a plastic material.

5. The protection arrangement according to claim 1, wherein the structural component is configured as an equipment element of a vehicle.

6. The protection arrangement according to claim 5, wherein the equipment element comprises one of a seat frame of a vehicle seat, a trim component of an interior fitting, engine compartment fitting of the vehicle or a chassis section of the vehicle.

7. The protection arrangement according to claim 1, wherein the air bag package is configured as a side airbag package for protecting a passenger of the vehicle.

8. The protection arrangement according to claim 1, wherein the air bag package is configured as a front airbag package for protecting a passenger of the vehicle.

9. The protection arrangement according to claim 1, wherein the air bag package is configured as a pedestrian air bag package for protecting a pedestrian of the vehicle.

10. The protection arrangement according to claim 1, wherein the air bag package is configured free of a shaping envelope.

11. The protection arrangement according to claim 1, wherein the air bag package comprises a shaping envelope configured as a foil encompassing the air bag package, and which is made of a textile material or which is designed as a housing.

12. The protection arrangement according to claim 1, further comprising a gas generator arranged in the air bag package, wherein the gas generator defines an inflation direction away from the structural component in the cross section;

wherein the bulging receiving section bulges in a direction opposite the inflation direction.

13. A vehicle comprising the protection arrangement according to claim 1, wherein the structural component comprises at least one of a seat frame of a vehicle seat, a trim component of an interior fitting, an engine compartment fitting of the vehicle or a chassis section of the vehicle.

14. A method for manufacturing a protection arrangement for a passenger of a vehicle having an air bag package and a structural component, the protection arrangement defining a cross section taken transverse to a first side and an opposing second side, the method comprising:

thermally pressing the air bag package together with the structural component to simultaneously form a first press contour in the air bag package and a second press contour in the structural component, the first press contour being a negative of the second press contour, the first press contour defining a bulging receiving section that is spaced apart from a first peripheral side and a second peripheral side of the air bag package in the cross section and received within the second press contour.

15. The method according to claim 14, further comprising receiving the bulging receiving section in the second press contour in a positive locking manner.

16. A vehicle seat assembly comprising:

a seat frame having an elongate component defining a first side that extends along a longitudinal extension of the elongate component and a second side that extends along the longitudinal extension of the elongate component, the first side being opposite the second side, a cross section taken transverse to the first side and the second side, and a reception portion with a profile geometry included in the cross section;

an inflator that defines an inflation direction pointing away from the seat frame in the cross section; and an air bag package having a first peripheral side in the cross section, a second peripheral side in the cross section, and a receiving section with a bulge defined between the first and second peripheral sides in the cross section, the bulge bulging in a direction opposite the inflation direction, the bulge being spaced apart from the first peripheral side and the second peripheral side in the cross section and having a permanent press contour negatively corresponding to the profile geometry, the bulge being received within the reception portion.

* * * * *